March 29, 1966 C. M. GOBHAI ETAL 3,243,114
FLUID LOGIC ARITHMETIC DEVICE
Filed June 24, 1964 2 Sheets-Sheet 1
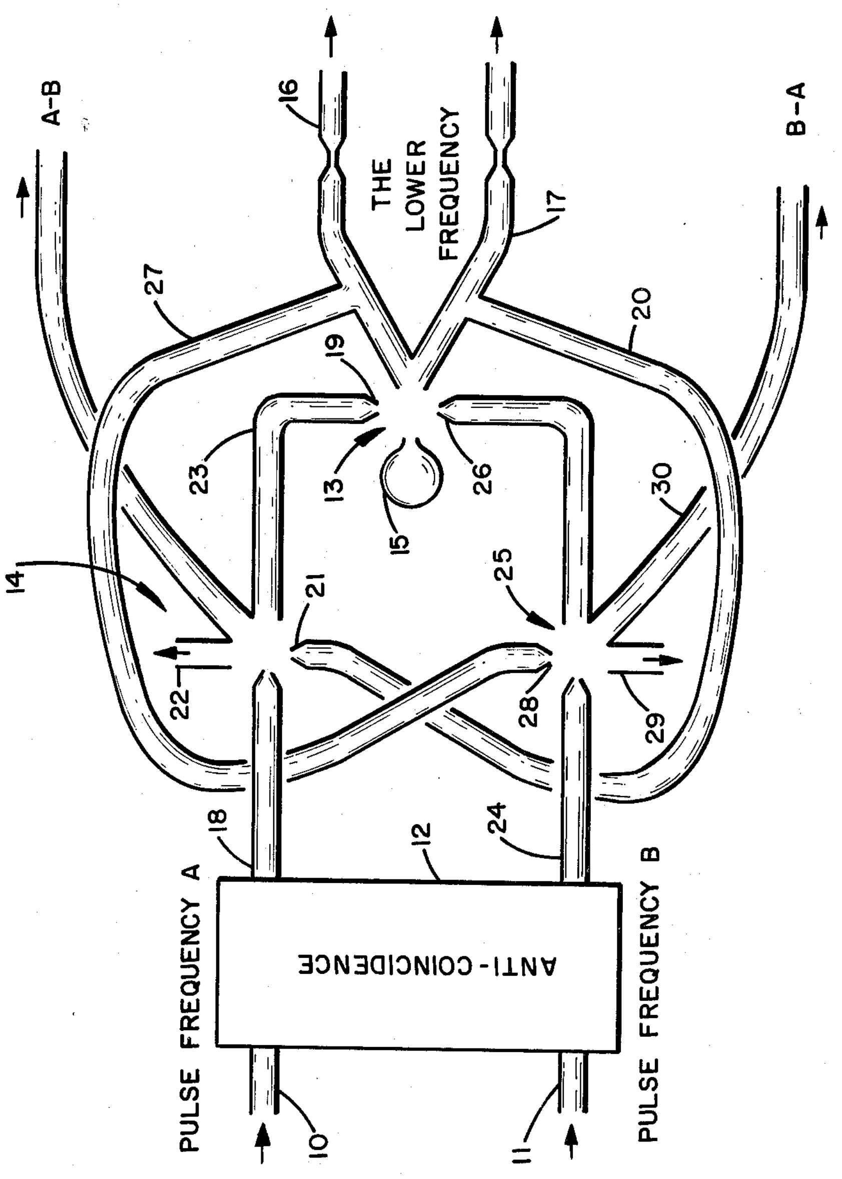
FIG. I
INVENTOR.
CAVAS M. GOBHAI
EDWARD SCHOPPE, JR.
BY
Laurence H. Patton
AGENT March 29, 1966 C. M. GOBHAI ETAL 3,243,114
FLUID LOGIC ARITHMETIC DEVICE
Filed June 24, 1964 2 Sheets-Sheet 2
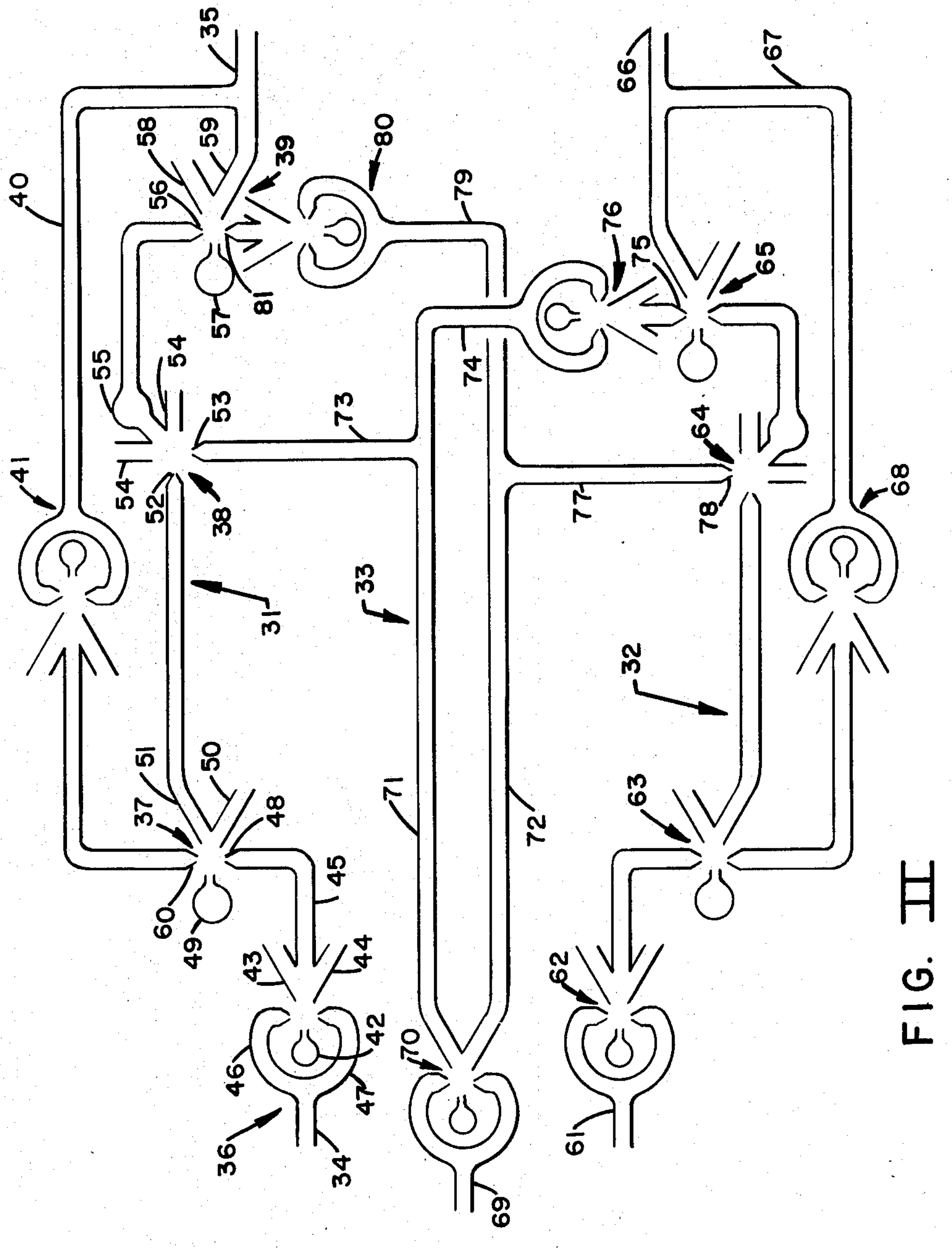
FIG. II
INVENTOR.
CAVAS M. GOBHAI
EDWARD SCHOPPE, JR.
BY Lawrence H. Patton
AGENT 3,243,114

FLUID LOGIC ARITHMETIC DEVICE

Cavas M. Gobhai, Cambridge, and Edward Schoppe, Jr., Walpole, Mass., assignors to The Foxboro Company, Foxboro, Mass., a corporation of Massachusetts Filed June 24, 1964, Ser. No. 377,657
1 Claim. (Cl. 235—201)

This invention relates to fluid logic devices which are compact and have no moving parts and operate on a binary basis.

In particular this invention concerns itself with arithmetic function and, as a particular application, subtraction of one frequency from another.

An application of this invention is in the use of one pulse train frequency in representation of a control system set point, and another in representation of a control system measurement value, for comparison and for subtraction of the lower frequency from the higher frequency to determine a control error.

This is a dynamic fluid device on a continuous flow basis.

This device operates on the basis of two pulse train systems, first passed through an anti-coincidence circuit to make all the pulses effective. Thereafter the two frequencies in turn operate a fluid logic flip-flop unit with feedback arrangements to suitable "and" gates, to provide branch outputs as the result of subtraction of one frequency from another.

This invention therefore provides a new and useful fluid logic arithmetic unit involving the use of feedbacks from the output of a flip-flop, to the control inputs thereof.

Other objects and advantages of this invention will be in part apparent and in part pointed out hereinafter and in the accompanying drawings, wherein:

FIGURE I is a schematic illustration of one form of a device embodying this invention; and FIGURE II is a schematic illustration of an anti-coincidence system for use in a combination of this invention.

In FIGURE I the pulse train flow is from left to right in the drawing, with an input passage for pulse frequency A at 10, and an input for pulse frequency B at 11. These input trains are then passed through an anti-coincidence unit 12 which is illustrated in and described hereinafter with respect to FIGURE II.

With this anti-coincidence device, the arithmetic subtractor in the function of this invention is assured of the action of each and every pulse from both of the pulse trains.

Accordingly, the output of the anti-coincidence unit 12, in terms of pulse frequency A, is applied to a fluid logic flip-flop binary unit 13, through an "and" gate 14. The flip-flop unit 13 has a power supply 15, and two output passages 16 and 17 in which signals appear in accordance with the position of the flow through the flip-flop unit.

The input of pulse frequency A to control the flip-flop 13 is in terms of a passage 18 from the anti-coincidence device 12 through the "and" gate 14 to provide a control input at 19 to the flip-flop unit 13. In the operation of the flip-flop unit, when a signal is applied thereto from the control input 19, the flip-flop output is achieved in the output passage 17. From the output passage 17, there is a feedback passage 20 which leads to the "and" gate 14 through a signal input at 21. When there is no feedback signal in the flip-flop feedback 20 and "and" gate input 21, then a signal from the input passage 18 will pass directly through the "and" gate 14 to provide a control signal at 19 to the flip-flop 13. Similarly, if there is a signal in the flip-flop feedback 20 and "and" gate input 21 at a time when there is no input pulse in the passage 18, then the feedback from the output passage 17 will go directly through the "and" gate 14 and vent as at 22.

If, however, there is simultaneously applied to the "and" gate 14, a signal from the input 18 and pulse train A, and a feedback signal at 21, then these two signals will meet and interact within the "and" gate and exit together in a common output passage 23.

In similar fashion, pulse frequency B is applied to the device through input passage 11, through the anti-coincidence device 12, and by way of input passage 24, is applied to an "and" gate 25. When there is no interference with the pulse in the input 24, it passes directly through the "and" gate to a control input 26 for the flip-flop unit 13, in opposition to the control input 19 from the pulse frequency A system.

When a pulse is effective in the flip-flop 13 from the control input 26, this output is in flip-flop output passage 16, and it in turn has a feedback passage 27, leading to a control input 28 in the "and" gate 25. In the absence of a pulse in the input passage 24 a signal from the "and" gate input 28 will pass directly through to vent as at 29. In the event of simultaneous appearance with a signal in the input 24 and the feedback 28 they will meet and interact in the "and" gate 25 and exit together through a common output 30 as a single signal.

In the operation of the device of FIGURE I, if for example, in the pulse train A, there are two consecutive pulses without interference from a pulse in the pulse train B, the first of these two pulses will pass directly through the "and" gate 14, assuming the existence of a reset situation wherein the flip-flop unit 13 starts with an output from passage 16.

This first input signal will enter the flip-flop 13 through the control input passage 19, to cause the flip-flop to change its output from passage 16 to passage 17. This output provides a feedback through the passage 20 and through the "and" gate 14 by way of "and" gate input 21, and out through the vent 22.

Accordingly, the first of two consecutive pulses has established the flip-flop unit 13 in a particular position, and has provided the feedback to the "and" gate in a preparatory action prior to the arrival of the second consecutive pulse.

When the second consecutive pulse arrives at the "and" gate 14, it interacts with the feedback signal which is already there, and passes out through the common output 23 as the output signal.

The first of two such consecutive signals will establish the situation, and the second will be exited as a signal in passage 23. The system therein involving the pulse frequency B operates in the same fashion only in the opposite sense with respect to the flip-flop 13.

Through the inputs 11 and 24, a first pulse will pass through the "and" gate 25 and will establish the flip-flop with an output 16 and the feedback through passage 27 to the "and" gate input 28. This feedback will at this point in time vent as at 29. However, when the next consecutive pulse, without interruption from the other train, comes along in the frequency B, it will meet the feedback from the input 28, interact within the "and" gate 25 and exit through the passage 13 as a single pulse signal.

Accordingly, if there are two such pulses in frequency A, an output pulse of "one" appears in the output 23. If after these two consecutive pulses, a pulse appears in the other frequency system B, it will change the state of the flip-flop 13 and, as between these two signals, frequency A with two pulses, and frequency B with one pulse, the subtractive answer would be "one," and this "one" appears in the output 23 as pulse frequency A minus B.

In like fashion where the pulse frequency B is greater than that of pulse frequency A the output will appear in the lower of the two systems through output passage 30 in terms of pulse frequency B minus A. An automatic shift over will occur so that the smaller will always be subtracted from the larger regardless of which system contains the greater frequency.

It may be noted that in the output of the flip-flop 13 both output 16 and 17 individually have the same output signal and it is in terms of the lower of the two frequencies.

This device may be used as a measurement versus set point function in a control system or in any other suitable application.

The anti-coincidence unit 12 of FIGURE I is illustrated in FIGURE II as a combination of this invention and is described as follows:

In FIGURE II the pulse train systems and the time oscillator system are illustrated as operating from left to right. One pulse train is indicated at 31, at the top of the drawing, and the other is indicated generally at 32, at the bottom of the drawing. The timing oscillator system is indicated generally at 33, between the pulse train systems 31 and 32. The pulse train system 31 has an input passage therefor at 34, an output passage at 35. This system 31 consists of a series arrangement of a differentiator 36, a flip-flop unit 37, an "and" gate 38, and a flip-flop 39. From the output 35 there is a feedback passage 40 leading back to the first flip-flop 37, through a differentiator 41.

The input differentiator 36 is provided with a power source at 42. It is generally in the form of a flip-flop unit, with the ordinary flip-flop outputs 43 and 44 used only as vents. Between the outputs 43 and 44 there is a central output 45 through which the pulse train continues into the flip-flop unit 37. The differentiator is operated by means of two curved passages 46 and 47 which are essentially uniform in shape. Both stem from the input passage 34. These passages 46 and 47 act as opposing control inputs for the differentiator 36.

By the nature of the formation of the differentiator or by a lateral starting set signal (not shown) it may be considered that the first pulse of the pulse train in the input 34 might use one or the other of the passages 46 and 47. Assuming it to be the passage 46, this first pulse would operate the differentiator to flip the output from the output vent 43 to the output vent 44. In so doing a pulse would be generated in the common output 45, representative of the controlling pulse which is operating the flip-flop device.

At this stage of the operation of the differentiator 36, by the nature of the fluid logic flip-flop, there will be a relatively high pressure at the control input of the passage 46 and a relatively low pressure at the control input of the passage 47. Because of this difference in pressure, after the first pulse arrives in the differentiator 36, there is a tendency to equalization of pressure back through the passage 46, and then forward through the passage 47. This tendency sets up a small stream in this counter-clockwise direction.

Accordingly, when the second pulse comes along in the input 34, it will encounter this counter-clockwise flow and will follow it so as to apply the second pulse to the control input 47. This action flips the output in passage 44 to the output passage 43, and in passing provides an output pulse in the common central passage 45.

The input frequency is thus duplicated in the output passage 45 of the differentiator 36. The purpose of this action is to provide a sharp pulse input to the flip-flop 37. If the input train is formed of step signals, they will be translated into pulses for the suitable operation of the flip-flop 37.

The pulse train, in the form of sharp pulses, now appears in the passage 45 and is applied to the flip-flop 37 at a control input 48. The flip-flop 37 is provided with a power source 49 and has a vented output 50 and an operating output 51.

The normal inactive situation of the flip-flop 37 is with the output in the vent passage 50. When there is a pulse in the control input 48, the flip-flop 37 has its output moved to the output passage 51 and this output continues, to provide a control input 52 to the "and" gate 38.

The "and" gate 38 has another control input 53, from the timing oscillator system 33. If there is no signal in the timing input 53 then a pulse in the input 52 will pass through the "and" gate and vent by means of passage 54. Similarly, a timing signal in the control input 53 occurring without a pulse in the input 50 will be vented to output 54.

In the event of simultaneous occurrence of signals in the "and" gate 38 both at 52 and 53, the signals will encounter each other within the "and" gate, mutually deflect each other, and exit through the "and" gate output at 55 as a signal representative of one pulse in the pulse train system 31. The signal in the output passage 55 of the "and" gate 38 is applied to the flip-flop unit 39 as a control input at 56. The flip-flop 39 has a power source at 57, a vent output 58, and an operating output 59. The flip-flop unit 39 is normally established with the output venting through passage 58. When a signal appears in the control input 56, the output is flipped over to the operating output passage 59 as an output signal for the pulse train system 31, by way of output passage 35.

Simultaneously with this action a signal is fed back through passage 40, and through differentiator 41, to a control feedback input 60 to the flip-flop 37. This action flips the signal therein back to the output vent passage 50 to reset this device and cut off the output signal of that system.

The differentiator 41 is structurally identical with the differentiator 36 in the input. It operates in the same manner, so that anything in the form of a step signal will be reduced to a pulse, A pulse will simply be transmitted as a duplicated pulse. Thus whatever controlling signals are applied to the flip-flops 37 in the feedback control input 60 are in the form of simple, short, sharp control pulses.

The pulse train system 32, shown at the bottom of the drawing, is a duplication of the system 31 described above and operates identically with respect thereto.

Thus the pulse train system 32 comprises a series arrangement of an input passage 61, a differentiator 62, a flip-flop unit 63, an "and" gate 64, and a final flip-flop unit 65, leading to an output passage 66. There is also a feedback passage 67 from the output passage 66, through a differentiator 68 to the flip-flop unit 63.

The timing oscillator system 33 comprises an input passage 69 to a timing oscillator. This is identical with and operates in the same way as the differentiator 36 of the pulse train system 31, except that the timing oscillator has no central common output, and both of its ordinary flip-flop outputs are used.

The two outputs of the timing oscillator are at 71 and 72. From the passage 71 there is a side passage 73 leading to the "and" gate 38 of the pulse train system 31, by way of the control input 53. Also from the timing oscillator output 71, there is an output passage 74 leading to the pulse train system 32, specifically the terminal flip-flop unit 65, as a control input 75. The passage 74 includes a differentiator 76 which provides a pulse output like that of the differentiator 36 in system 31, for the purpose of providing suitable operating signals for the flip-flop unit 64.

Similarly, from the timing oscillator output 72 there are lateral passages with one at 77, to the pulse train system 32, as a control input at 78, to the "and" gate 64. There is also a lateral passage at 79, through a differentiator 80, to the terminal flip-flop 39 of the pulse train system 31, by way of an input control passage at 81.

It will be seen that when the timing oscillator provides a step signal in the output 71, it simultaneously activates the pulse train system 31 "and" gate 38, and resets the pulse train system 32 flip-flop 65.

In similar fashion, an output signal in the timing oscillator passage 72, simultaneously activates the pulse train system 32 "and" gate 64, and resets the pulse train system 31 terminal flip-flop 39.

In the operation of this device, the timing oscillator is established so that it operates, for example, first in system 31, and then in system 32, in a regular, scanner-like procedure. It looks first to the system 31, to see if there are any pulses going through, or ready to go through. If so, it lets them through, meanwhile holding back pulses in system 32. The reverse is accomplished by way of a signal in the timing oscillator output 72.

If the timing oscillator is in the actuation stage with respect to the system 31, then an input pulse will proceed through the flip-flop 37 and through the "and" gate 38 because of the simultaneous appearance of signals at 52 and 53. It will then operate the flip-flop 39 to provide the output in the passage 35, and the feedback in the passage 40 to reset the initial flip-flop 37. The result is a single output pulse in passage 35.

While this is going on, if there is a coincident pulse in the pulse train system 32 it will reach the "and" gate 64, but it will not pass through, except to vent, because there will be no signal in the input passage 78.

When the timing oscillator reverses, and actuates the system 32, the signal which is waiting at the gate 54 will be allowed to pass through. Similar holding action is effective with respetc to the gate 38 and the pulse train system 31, when a signal arrives there during the time when the timing oscillator is activating the system 32.

Thus in case of a pulse in one system coincident with a pulse in the other system, according to the timing of the oscillator 70, one of these pulses will be held back long enough for the other to go through.

It is preferable in this situation that the frequency of the timing oscillator be such that one cycle comprises a positive operation of the system 31 plus a positive operation of the system 32. The frequency of the pulses in either system will be not more than one such pulse to such a cycle of the timing oscillator.

With the system according to this invention, none of the pulses are lost. There simply is a delay of one when there is a coincidence of two. The two pulse train systems may represent a control function such as one being a representative of a measurement, and the other of a set point. They also may be any other two suitable pulse trains for whatever similarly suitable purpose wherein anti-coincidence is desirable.

This invention therefore provides a new and useful fluid logic device in the form of an arithmetic system with respect to pulse train wherein two consecutive pulses are provided with the first pulse establishing the situation and then the second pulse reacting thereto.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

We claim:

A fluid logic pulse frequency reversible subtractor device comprising a flip-flop unit, a pair of opposing input control passages to said flip-flop unit, an "and" gate in each of said control passages such that one output of each "and" gate leads directly to said flip-flop unit to provide said control opposition, pulse anti-coincidence means operatively encompassing both said input control passages prior to said "and" gates, said anti-coincidence means having two outputs, one for each of said control passages such that each anti-coincidence output leads directly to the "and" gate of its respective control passage as one of the controls for said "and" gate, a feedback passage from each of the output passages of said flip-flop to said "and" gates as the other of the "and" gate controls, wherein the feedback passage from the flip-flop output passage activated by means of a signal through one of said control passages is led to be a control of the "and" gate of said last named control passage, and the feedback passage from the other flip-flop output passage is led to be a control of the "and" gate of the other control passage, whereby the lower frequency pulses in one of said control passages are subtracted from the higher frequency pulses in the other of said control passages.

References Cited by the Examiner

UNITED STATES PATENTS

| | | | |
|---|---|---|---|
| 3,081,942 | 3/1963 | Maclay | 235—151 |
| 3,093,306 | 6/1963 | Warren | 235—201 |
| 3,190,554 | 6/1965 | Gehring et al. | 235—201 |

OTHER REFERENCES

Mitchell, "Fluid Binary Counter," IBM Technical Disclosure Bulletin, vol. 6, No. 2, July 1963, page 30.

Mitchell et al., "Self-Locking Fluid Sensing Station," IBM Technical Disclosure Bulletin, vol. 6, No. 3, August 1963, page 31.

LEO SMILOW, *Primary Examiner.*

W. F. BAUER, *Assistant Examiner.*